Dec. 11, 1962 C. W. HEPPENSTALL 3,067,968
RETRACTABLE JET ENGINE NOISE SUPPRESSOR
Filed Dec. 29, 1958 4 Sheets-Sheet 1
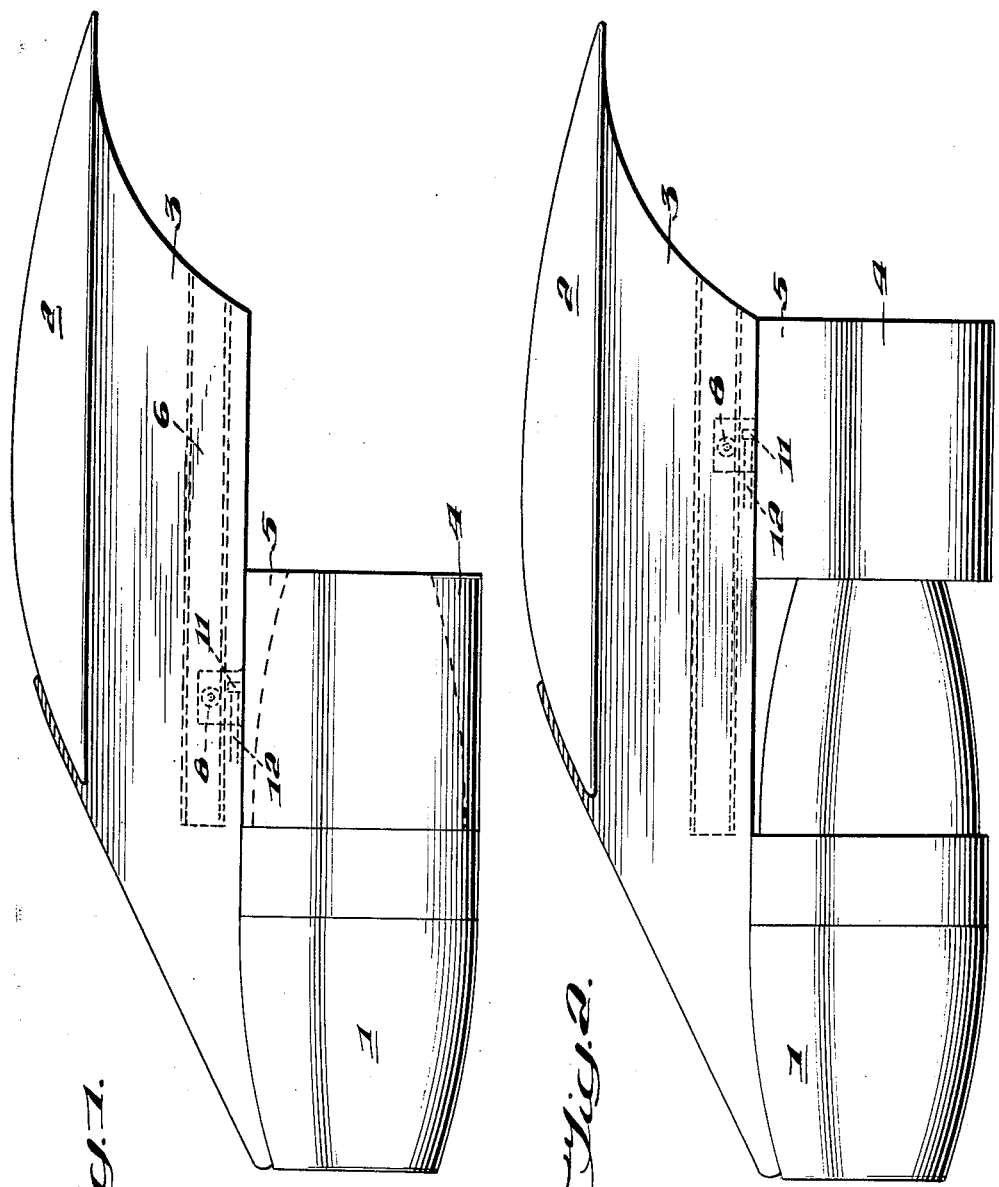
INVENTOR
CHARLES W. HEPPENSTALL,
BY Larson and Taylor
ATTORNEYS

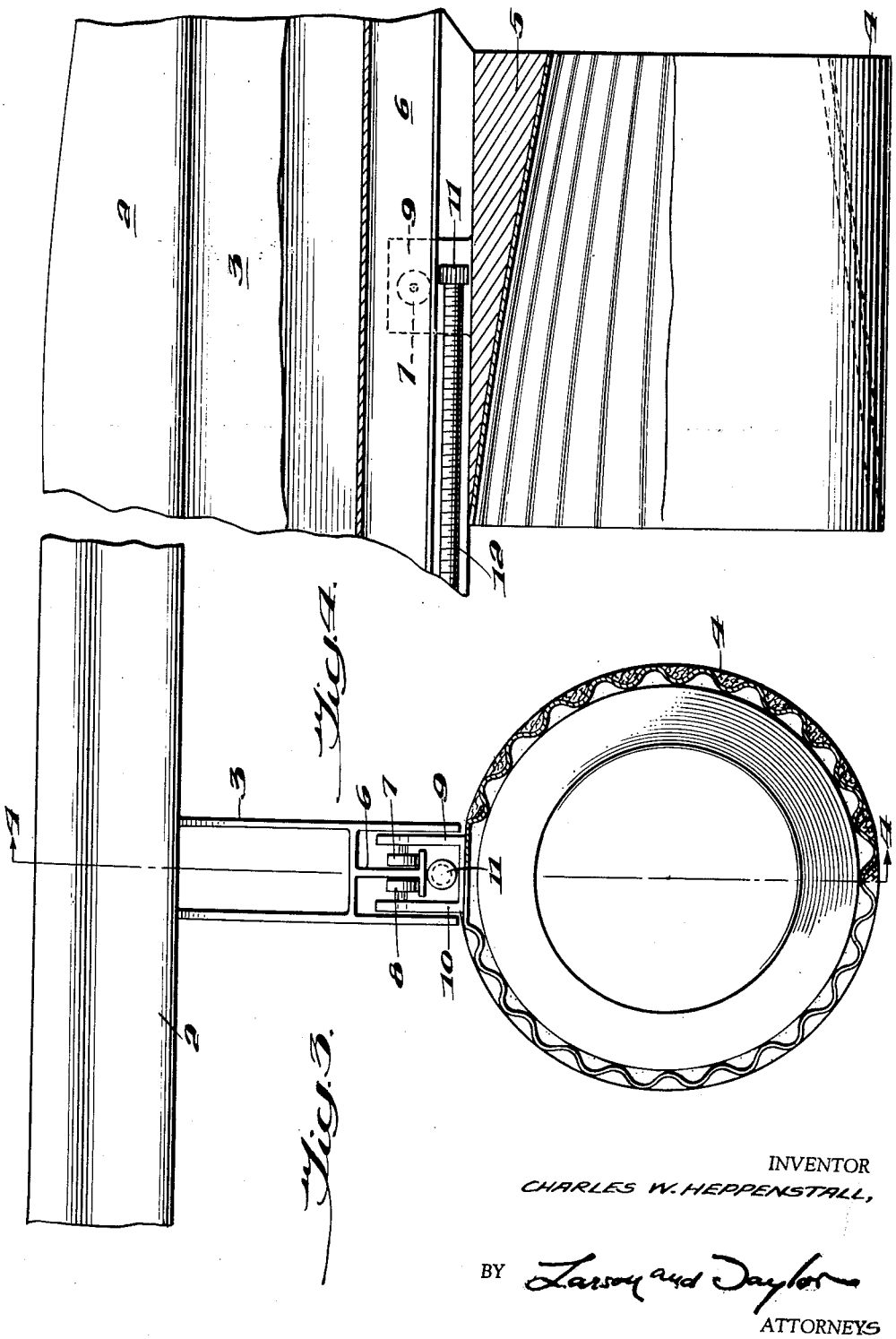

Dec. 11, 1962 C. W. HEPPENSTALL 3,067,968
RETRACTABLE JET ENGINE NOISE SUPPRESSOR
Filed Dec. 29, 1958 4 Sheets-Sheet 3
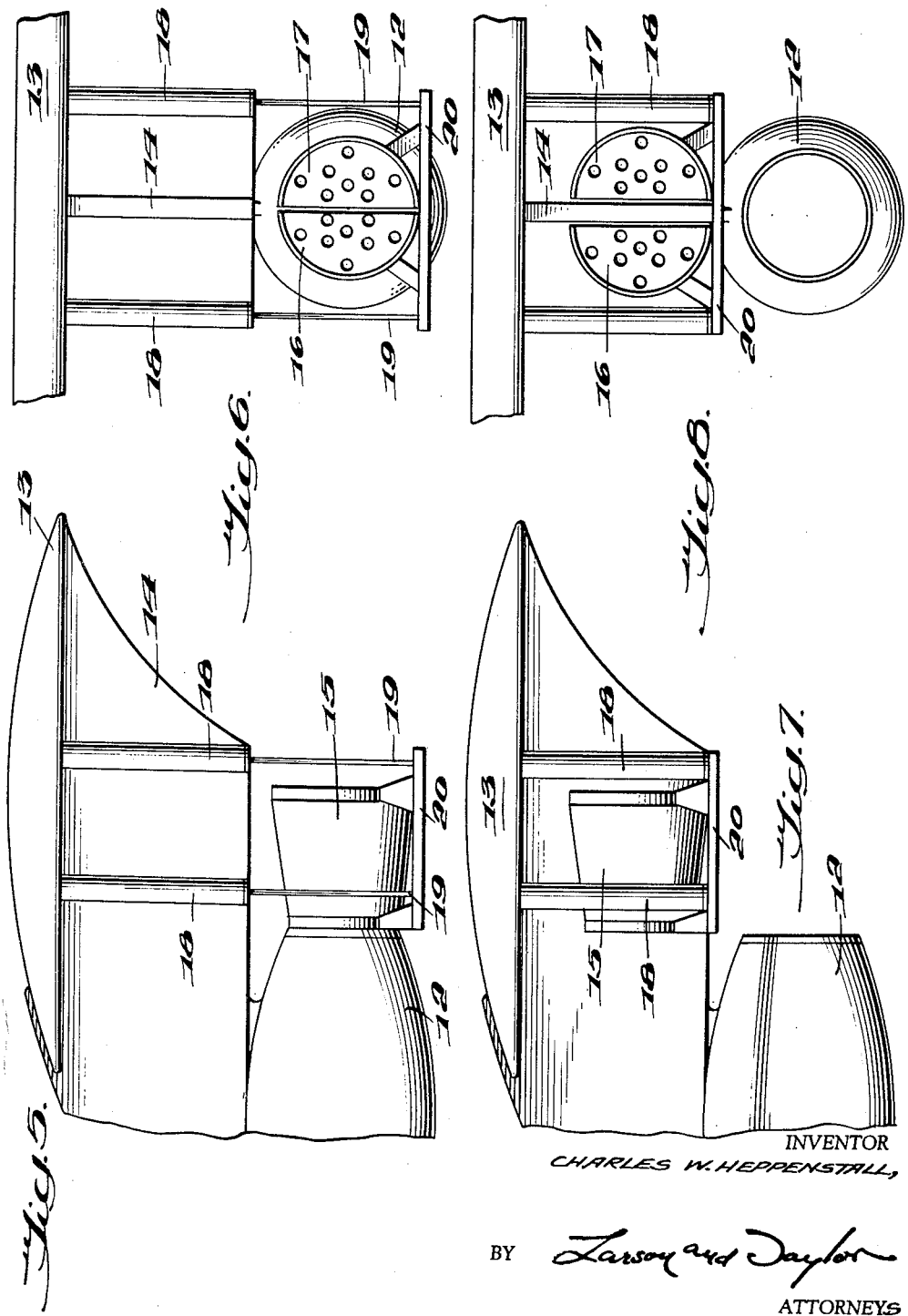
INVENTOR
CHARLES W. HEPPENSTALL,
BY Larson and Taylor
ATTORNEYS Dec. 11, 1962  C. W. HEPPENSTALL  3,067,968
RETRACTABLE JET ENGINE NOISE SUPPRESSOR
Filed Dec. 29, 1958  4 Sheets-Sheet 4

INVENTOR
CHARLES W. HEPPENSTALL,

BY Larson and Taylor

ATTORNEYS

United States Patent Office 3,067,968
Patented Dec. 11, 1962

1

3,067,968
RETRACTABLE JET ENGINE NOISE SUPPRESSOR
Charles William Heppenstall, P.O. Box 2325,
Delray Beach, Fla.
Filed Dec. 29, 1958, Ser. No. 783,332
1 Claim. (Cl. 244—74)

This invention relates to an attachment for a jet engine and more particularly to a retractable jet engine noise suppressor.

The advent of jet airliners to the commerical field has brought with it problems in connection with the noise of the jet engine. The frequency range and sound level of the noise created by the exhaust gases from a jet engine is particularly disturbing to those persons living in the environs of an airport and to persons at the airport.

Many solutions have been proposed for this problem usually involving the application of a muffler-like member to the exhaust of the jet engine. Such devices reduce the noise level of the jet engine but also reduce the efficiency of the engine.

It is estimated that the type of noise suppressor used on a foreign make jet engine plane imposes a 1% penalty on the efficiency of the jet engine. It is estimated that the type of noise suppressor now being used and about to be used on all U.S. jet engine planes will impose a penalty of 3% on the efficiency of the engine. On one major U.S. airline, it is estimated that the penalty of 3% on the jet engine efficiency will add approximately $4,000,000.00 to the annual fuel cost.

The present invention provides a noise suppressor which is adapted to be shifted between operative and retracted positions so that the suppressor solves the noise problem during takeoff, climbing; and or landing periods yet can be entirely removed from its operative position adjacent the exhaust area of the engine so that there is no loss in jet engine efficiency. The retracted position may be over a portion of the jet engine casing; in the jet engine pod and pylon area; or in recesses in the fuselage depending upon the particular jet engine design and location.

The design of retractable jet engine noise suppressor embodied in this invention will achieve a reduction of five decibels or more during the take-off; climb; and landing periods.

An object of the present invention is to provide a jet engine noise suppressor which is retractable.

Another object of the present invention is to reduce the noise level of jet engines during takeoff, climb; and landing periods while maintaining the efficiency thereof during the major portion of the flight time.

Other objects and many of the attendant advantages of the present invention will become more fully apparent upon consideration of the following detailed specification in connection with the accompanying drawings wherein:

FIG. 1 is a side elevation of one embodiment of the present invention showing the noise suppressor in retracted position, FIG. 2 is a side elevation showing the noise suppressor in operating position, FIG. 3 is an end view showing a portion of the operating mechanism for retracting the noise suppressor.

FIG. 4 is a sectional view along the line 4—4 of FIG. 3,

FIG. 5 is a side elevation of another embodiment of the present invention,

FIG. 6 is an end view thereof,

FIG. 7 is a side elevation showing the noise suppressor of FIG. 5 in retracted position.

FIG. 8 is an end view of FIG. 7, and

Figure 9:
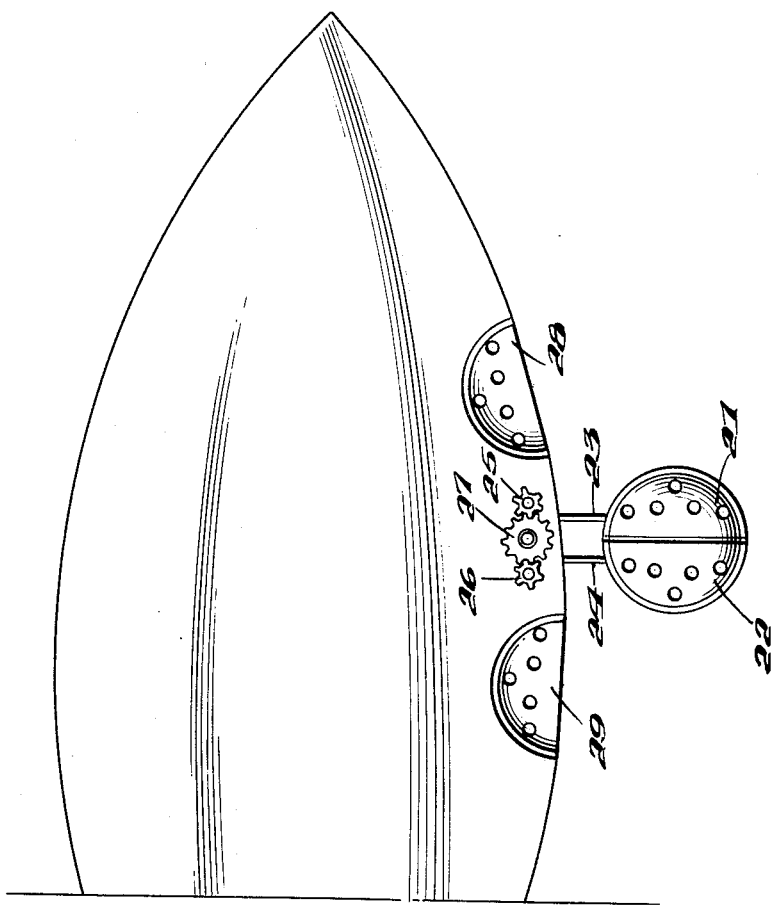
FIG. 9 is an end view partly in a section of still another embodiment of the present invention.

Referring now more specifically to the drawings where-

2 in like numerals indicate like parts throughout the several views there is shown at 1 in FIG. 1 a jet engine which is supported from the airplane wing by a pod and pylon 3. The retractable noise suppressor is shown at 4 and in the FIG. 1 position is retracted over the jet engine casing. The noise suppressor has corrugations, as shown at 5, which become deeper at the rear of the suppressor. Openings which are formed between the end of the suppressor most closely adjacent the jet engine and the jet engine when the suppressor is in an operative position serve to induce cold air into the hot exhaust gases. Between the inner corrugations and the outer shell of the noise suppressor, there is sound insulating material such as asbestos; glass fibers; foamed plastic and/or other suitable materials.

By a means to be described hereinafter the noise suppressor 4 is adapted to be shifted to the position shown in FIG. 2. In this position the noise suppressor is adapted to reduce the noise emanating from the exhaust of the jet engine 1.

The means for shifting a noise suppressor between the position shown in FIGS. 1 and 2 may take a variety of forms. In the embodiment disclosed, the plyon or supporting strut for the jet engine is provided with an I beam 6 as shown in FIG. 3. The lower cross piece of this I beam serves as a support for rollers 7 and 8 which are rotatably mounted on vertically extending support bars 9 and 10 integral with the noise suppressor 4. Fixedly mounted between the vertical supporting elements 9 and 10 is a nut 11 and this nut is adapted to be engaged by a screw 12. The screw 12 may be driven by any suitable motor means (not shown) so that rotation of the screw will cause linear movement of the noise suppressor 4. The nut and screw drive may be of the type in which ball bearings are utilized. Alternately a hydraulic cylinder and piston may be used to move the noise suppressor. The specific drive means may be varied to suit various operational requirements.

The embodiment which retracts the noise suppressor over the jet engine casing, may be used whether the jet engines are located in pods and pylons attached to the wings or the jet engines are located in pods and pylons attached to the fuselage. FIGS. 1 through 4 show the pods and pylons attached to the wing structure. When in the retracted position the noise suppressor will reduce the compressor and turbine "whine."

In the embodiment shown in FIGS. 5 to 8 inclusive the jet engine is shown at 12 and is supported from wing 13 by means of pylon or strut 14. The retractable noise suppressor is shown at 15 and, as is evident from FIGS. 6 and 8, comprises semi-circular sections 16 and 17. This noise suppressor may be of the type in which a plurality of individual nozzles are provided for the exhaust gases.

Means is provided for shifting the noise suppressor between operative and retracted positions. In the embodiment shown, hydraulic means is utilized and this hydraulic means comprises a plurality of cylinders 18 which are fixedly mounted on the lower surface of the wing structure 13 and the pylon or strut structure 14. Elongated piston rods 19 are fixedly mounted on a platform 20 and these piston rods extend upwardly into the hydraulic cylinders. A hydraulic pump is provided for pumping fluid in either end of the cylinders so that the noise suppressor may be shifted between the position shown in FIG. 5 and FIG. 7. It can be seen from FIGS. 6 and 8 that the supporting pylon or strut 14 prevents simple vertical movement of the noise suppressor. Means (not shown) is provided for moving the noise suppressor sections 16 and 17 horizontally to the position shown in FIG. 8 so that the pylon or strut 14 extends between these sections when the suppressor is in the retracted position.

Alternately the suppressor housings may be activated by a drive source, consisting of a motor, a screw and nut; especially a screw and ball-bearing nut. There are other suitable means for providing the necessary vertical and horizontal movements.

Sound insulating material such as asbestos, glass fibers, foam plastic and or other suitable materials is placed between the exterior surface of the nozzles and the inside of the suppressor housing.

The embodiment of the invention shown in FIG. 9 is intended for use on those aircrafts in which the jet engine is mounted on the fuselage. In this embodiment the noise suppressor is divided into sections 21 and 22 which are supported by means of struts 23 and 24 respectively. The struts have gear means 25 and 26 suitably connected therewith so that rotation of a central gear 27 by a motor (not shown) will cause rotation of the noise suppressor sections 21 and 22 from the position shown into suitable recesses 28 and 29 in the fuselage. It can be readily seen that a suitable gear reversal means (not shown) must be provided for one of the sections of the noise suppressor so that rotation of the central gear 27 will cause opposite rotation of the sections 21 and 22.

The presently disclosed embodiments of a noise suppressor provide means whereby the suppressor may be placed in operative position during takeoff, climb and landing periods. However, during normal flight the suppressor may be retracted so that it does not interfere with the operating efficiency of the jet engine.

The noise suppressor in each of the arrangements will not interfere with the operation of a thrust reverser in either the fully operative or fully retracted position.

Obviously many modifications and variations of the present invention are possible in light of the above teachings. What is claimed as new and desired to be secured by Letters Patent is:

A jet engine noise suppressor for a jet engine for an aircraft, the jet engine having an outer casing suspended from a portion of the aircraft, the rear end portion of the jet engine being tapered inwardly from a central maximum diameter, the noise suppressor comprising a substantially cylindrical body encircling the outer casing of the jet engine, means disposed centrally on said body for supporting said body from the aircraft for movement between a retracted position encircling the jet engine to an extended position surrounding the jet stream, the cylindrical body of the noise suppressor having a diameter substantially equal to the diameter of the central portion of the jet engine whereby no air passes through the noise suppressor when in a retracted position, means within the body for absorbing sound, said means including longitudinal corrugations around the inner face of the exterior wall of the body, the corrugations being spaced from the jet engine a substantial distance when the suppressor is in an extended position to form a substantial opening between the rear portion of the jet engine and the front end of the noise suppressor in a plane perpendicular to the longitudinal axis of the engine, the opening being of a width equal to the difference in diameter between the central portion of the jet engine and the rear end portion whereby cold air at atmospheric pressure is mixed directly with the exhaust gases, the longitudinal corrugations mixing the air and gases.

References Cited in the file of this patent

UNITED STATES PATENTS

| | | |
|---|---|---|
| 2,648,192 | Lee | Aug. 11, 1953 |
| 2,718,273 | Dehaus | Sept. 20, 1955 |
| 2,845,775 | Tyler | Aug. 5, 1958 |
| 2,988,302 | Smith | June 13, 1961 |

FOREIGN PATENTS

| | | |
|---|---|---|
| 890,896 | France | Nov. 19, 1943 |

OTHER REFERENCES

"A Jet Exhaust Silencer," SAE Transactions, vol. 64 1956 (FIGURE 10, page 299 relied upon).

National Advisory Committee for Aeronautics Technical Note 4317; "Turbojet Engine Noise Reduction with Mixing Nozzle-Ejector Combinations," August 1958, Washington, D.C. (page 20 relied on).

Page 13 of Technical Note 4317 "Turbojet Engine Noise Reducton with Mixing Nozzle-Ejector Combination," August 1958, Washington, D.C.